Sept. 25, 1956 W. C. STRUVEN 2,764,689
PULSED OSCILLATOR
Filed Jan. 26, 1954
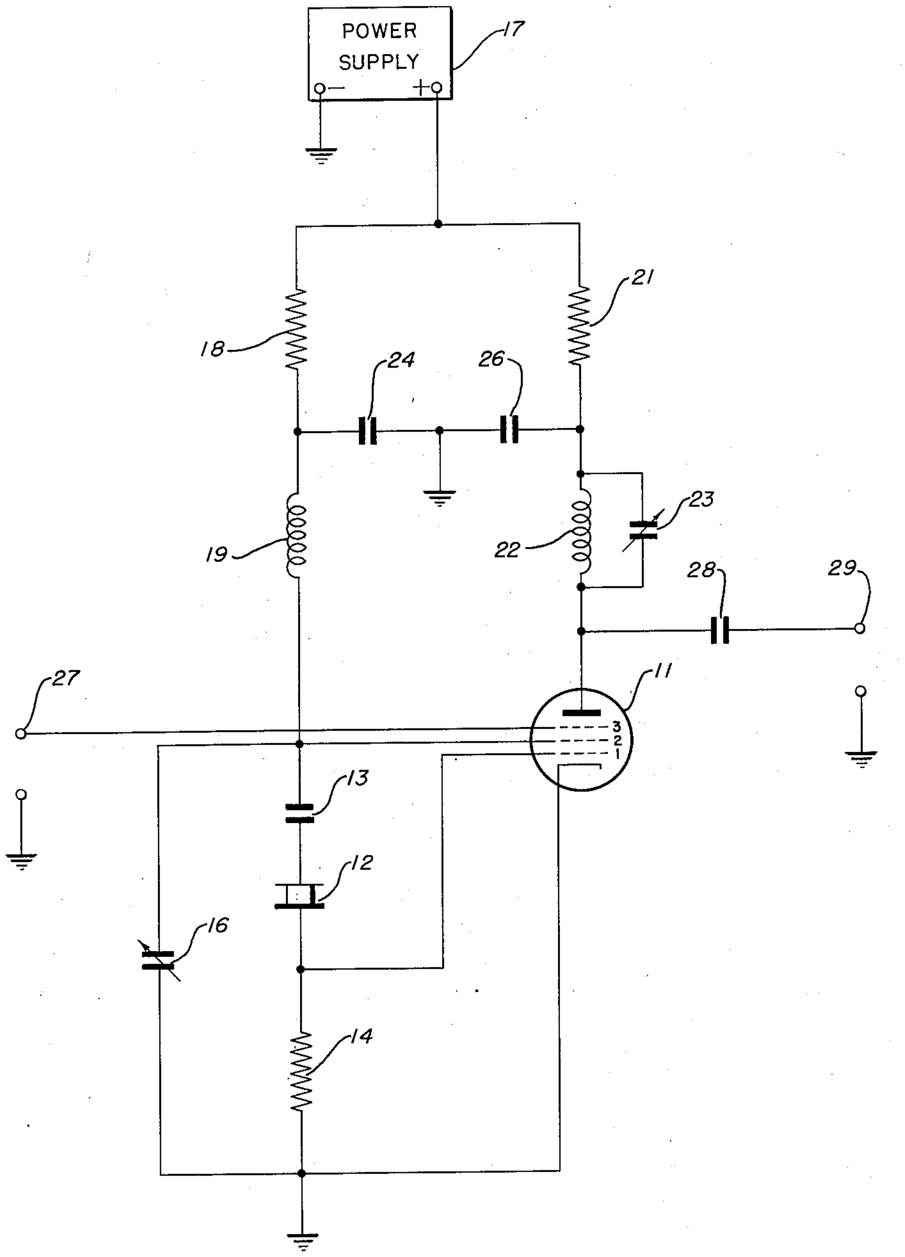
INVENTOR.
WARREN C. STRUVEN
BY
Roland A. Anderson
ATTORNEY.

United States Patent Office 2,764,689 Patented Sept. 25, 1956

2,764,689

PULSED OSCILLATOR

Warren C. Struven, Berkeley, Calif., assignor to the United States of America as represented by the United States Atomic Energy Commission Application January 26, 1954, Serial No. 406,379

1 Claim. (Cl. 250—36)

The present invention relates, in general, to an improvement in oscillator circuits and, more particularly, to an improved pulsed or gated oscillator.

Oscillator circuits require a certain amount of time to build up the amplitude of oscillators following energization of the circuit and, in applications where intermittent oscillator output signals are required, certain difficulties are encountered as a result of this initial time delay. Conventionally, there are employed in such applications the combination of an oscillator circuit and a gating circuit or alternatively the oscillator output signals lag the initiating or energizing signals. The present invention provides an improved circuit adapted to produce a high frequency oscillating signal without a time lag following application of the input signal and without the complicated circuitry conventionally employed to produce such a result.

The present invention employs but a single tube which operates not only as the oscillator tube but also as a gate tube and will, therefore, be seen to be highly advantageous over conventional circuits designed to produce intermittent high frequency signals.

It is an object of the present invention to provide an improved pulsed oscillator.

It is another object of the present invention to provide a single tube oscillator circuit having gating means incorporated within said tube.

It is yet another object of the present invention to provide an improved simplified gating oscillator.

Various other advantages and possible objects of the present invention will become apparent to those skilled in the art from the following description of the invention taken together with the accompanying drawing, wherein the sole figure is an electrical diagram of a preferred embodiment of the invention.

Considering the elements and connections of the invention and referring to the drawing, there is provided a single multielement tube 11. This tube is illustrated as a pentode vacuum tube having an anode, a cathode, and first, second and third grids therebetween. The cathode of the tube 11 and the first and second grids thereof are connected in an oscillator circuit wherein the second grid operates as the plate electrode of an oscillator tube, and this circuit is illustrated as a Pierce oscillator circuit. A piezo electric crystal 12 is connected between the first and second grids of the vacuum tube 11 with a blocking capacitor 13 being connected between the crystal and the second grid. Grid bias for the oscillator portion of the tube is provided by a resistor 14 connected between the cathode and first grid of the tube and a variable capacitor 16 is connected between the cathode and second electrode of the tube. Oscillations of this circuit are controlled by the crystal 12 with the first grid 1 of the tube 11 acting as the control electrode between the cathode and second grid of the tube. Upon energization of this circuit, there is established an oscillating current discharge between the cathode and second grid of the tube 11.

Energization of the oscillator circuit and of the tube 11 is accomplished by the provision of a power supply 17 which has the positive terminal thereof connected through a load resistor 18 and a choke coil 19 to the second grid of the tube 11. Grounding of the negative terminal of power supply 17 and the cathode of the tube 11 provides a return path so that the oscillator circuit is energized through these connections and the blocking capacitor 13 prevents impression of the direct current power supply voltage upon the crystal and the first control electrode. Similarly, there is connected to the positive terminal of power supply 17 another load resistor 21 and in series therewith a tuned circuit consisting of an inductor 22 and variable capacitor 23 in parallel. Connection is made from the power supply 17 through the load resistor 21 and tuned circuit to the anode of the tube 11 and with the above-noted ground return path plate voltage is thereby supplied to the tube. There may also be provided a high frequency return path including a pair of capacitors 24 and 26 connected together at ground and at their opposite ends to the low voltage ends of the load resistors 18 and 21, respectively.

Control of the above-described circuit is provided by the third grid of the vacuum tube 11 which is connected to an input terminal 27, which is adapted to have impressed between same and ground an input signal. The output signal of the circuit is taken from the anode of the vacuum tube 11 which is coupled through a blocking capacitor 28 to an output terminal 29, so that the output signal appears between terminal 29 and ground.

Operation of the circuit follows directly from the above description of the elements thereof and with the power supply 17 energized, there is applied a positive potential to the second control grid of the tube 11 so that discharge occurs between the cathode and second control grid of the tube inasmuch as the cathode is grounded. This discharge becomes oscillatory in nature owing to the crystal 12 connected between the second grid of the tube which operates as the anode in the oscillator circuit and the first grid of the tube which operates as the control electrode in the oscillator circuit. With the proper choice of crystal 12 the frequency of this oscillation may be set as desired. There normally occurs between the cathode and second electrode of the tube 11 an oscillating current. There is also applied between the cathode and anode of the tube 11 the potential of the power supply 17 so that this oscillatory discharge, above described, would normally extend to the anode of the tube; however, in the instance wherein only infrequent high frequency signals are to be applied to the output terminal 29, there would be applied to the input terminal 27 a sufficiently large negative signal to cut off the tube and render same nonconducting between the cathode and anode thereof. In this circumstance no plate current flows in the tube 11 although the oscillatory current continues to flow between the cathode and second grid of the tube. Controlled output of high frequency signals is then produced by the application of positive voltage pulses to the input terminal 27. With the amplitude of the input signal sufficient to overcome the negative bias normally applied to the third grid of the tube, the tube then becomes conducting and the oscillatory current reaches the anode of the tube. The tube then conducts and there appears at the anode thereof a high frequency voltage resulting from the oscillatory current in the oscillator circuit. The wave shape of the output signal may be adjusted to that of a sine wave by tuning the tuned circuit connected between the anode of tube 11 and the plate resistor 21 thereof as by varying the value of the capacitor 23. There thus appears at the output terminal 29, or actually between same and ground, a high frequency signal responsive to the input signal at terminal 27. Should an opposite operating circumstance exist wherein it is desired that a high frequency signal be normally supplied to the output terminal 29 and that it be ceased or cut off only at the instance of input signals, there need not be applied to the third grid of the tube 11 a negative bias, but instead the normal oscillating current in the tube would be allowed to reach the anode and would be only cut off in response to a sufficiently large negative voltage pulse applied between the input terminal 27 and ground, as same would render the tube nonconducting as to the anode thereof.

It will be apparent from the foregoing that the circuit of the present invention serves a variety of functions with a minimum of complexity and that it fulfills all of the objects of the invention set forth above. The tube 11 has been illustrated and described as a pentode vacuum tube; however, other tubes may be employed in this respect and optimum performance may be obtained with a tube having five grid electrodes with two added grids between the third grid and anode, and in such case the fourth grid is connected to the second and the fifth grid to the cathode for maximum shielding of the anode from the oscillatory discharge between the cathode and second grid.

Although the invention has been described with respect to but a single embodiment, it will be apparent to those skilled in the art that various modifications are possible within the spirit and scope of the invention so that no limitation is intended except by the terms of the following claim.

What is claimed is:

A gated oscillator comprising a pentode vacuum tube including an anode, cathode, control grid, screen grid, and suppressor grid; a piezoelectric crystal connected between the screen grid and control grid of said tube; a resistor connected between the cathode and control grid of said tube, power supply means; means connecting said power supply means across said tube and between the cathode and screen grid thereof for establishing an electric discharge between said latter two tube elements with said discharge being oscillatory at a frequency determined by said crystal; an output terminal connected to the anode of said tube; and an input terminal connected to the suppressor grid of said tube for applying gating signals thereto whereby signals at said output terminal are oscillatory and occur in response to signals at said input terminal.

References Cited in the file of this patent

UNITED STATES PATENTS

| | | |
|---|---|---|
| 2,103,655 | Whittaker | Dec. 28, 1937 |
| 2,124,189 | Dow | July 19, 1938 |
| 2,230,097 | Whittaker | Jan. 28, 1941 |
| 2,292,439 | Golicke | Aug. 11, 1942 |
| 2,512,729 | Usselman | June 27, 1950 |
| 2,519,419 | Varela | Aug. 22, 1950 |